United States Patent [19]

Wasco, Jr. et al.

[11] 4,165,661
[45] Aug. 28, 1979

[54] MACHINE TOOL CONSTRUCTION

[75] Inventors: Anthony Wasco, Jr., Saginaw; David L. Kreucher, Frankenmuth, both of Mich.

[73] Assignee: The Wickes Corporation, Saginaw, Mich.

[21] Appl. No.: 794,803

[22] Filed: May 9, 1977

[51] Int. Cl.² ............................ B23B 3/06; B23B 3/30
[52] U.S. Cl. ............................................. 82/2 R; 82/3; 82/17; 82/21 A
[58] Field of Search .................... 82/3, 5, 21 A, 21 R, 82/2 B, 2 R, 17

[56] References Cited

U.S. PATENT DOCUMENTS

| | | | |
|---|---|---|---|
| 2,611,290 | 9/1952 | Bullard | 82/3 X |
| 2,691,312 | 10/1954 | Stewart | 82/21 A |
| 2,723,582 | 11/1955 | Salome et al. | 82/21 A |
| 3,190,157 | 6/1965 | Ciccarelli | 82/5 |
| 3,472,104 | 10/1969 | Berly | 82/5 |

Primary Examiner—Leonidas Vlachos
Attorney, Agent, or Firm—Learman & McCulloch

[57] ABSTRACT

A cam controlled contour turning, facing, and boring machine tool having a frame on which a first slide is mounted for reciprocable movements along a generally horizontal path and a second slide mounted on the first slide for movements with the latter and for lateral movements relative to the first slide either normal to or at an inclination of less than 90° to the path of movement on the first slide. On the frame is mounted supporting means for one or more workpieces and on the second slide is mounted tooling engageable with the workpieces. The movements of the slides are effected by two cams, one of which controls the movements of the first slide and the other of which controls the movements of the second slide, the cams being rotated simultaneously by driving means mounted on the first slide. Rigid motion transmission means acts between the first slide and its cam to ensure movements of the first slide in accordance with variations in the contour of the cam, and second motion transmitting means acts between the second slide and its cam for the same purpose. The cams are removable and replaceable through the rear of the machine frame to enable substitution of one set of cams for another without requiring removal or adjustment of either slide or of the tooling.

19 Claims, 10 Drawing Figures

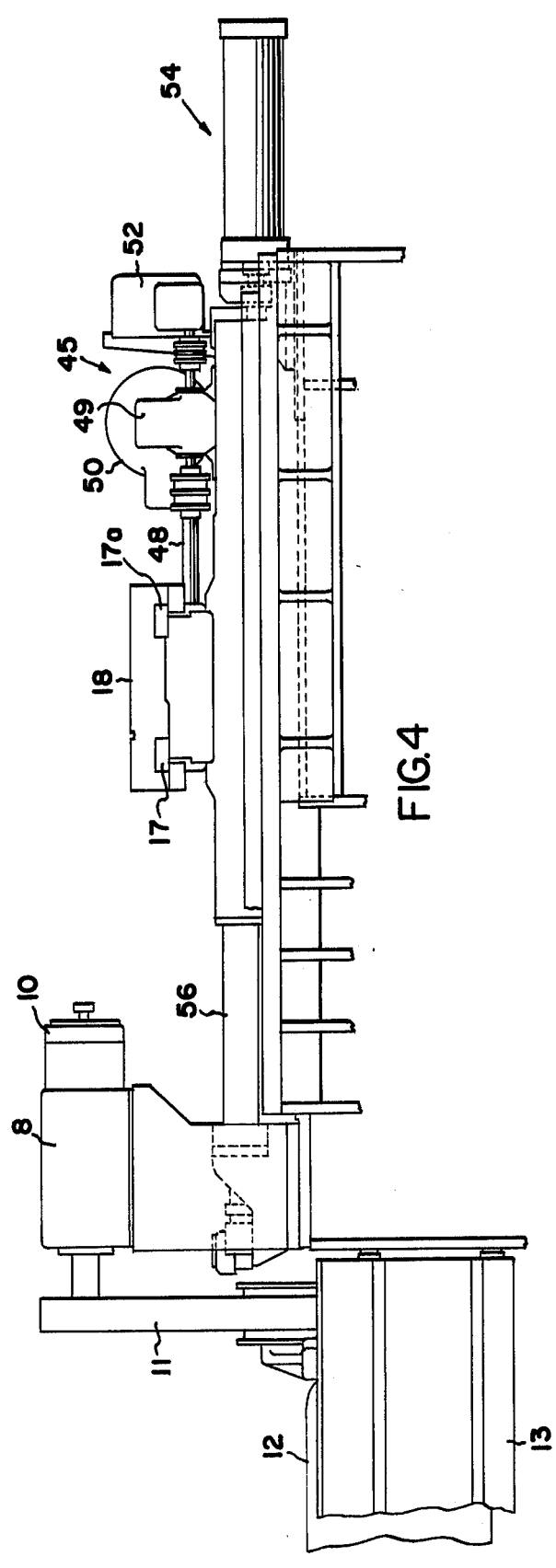
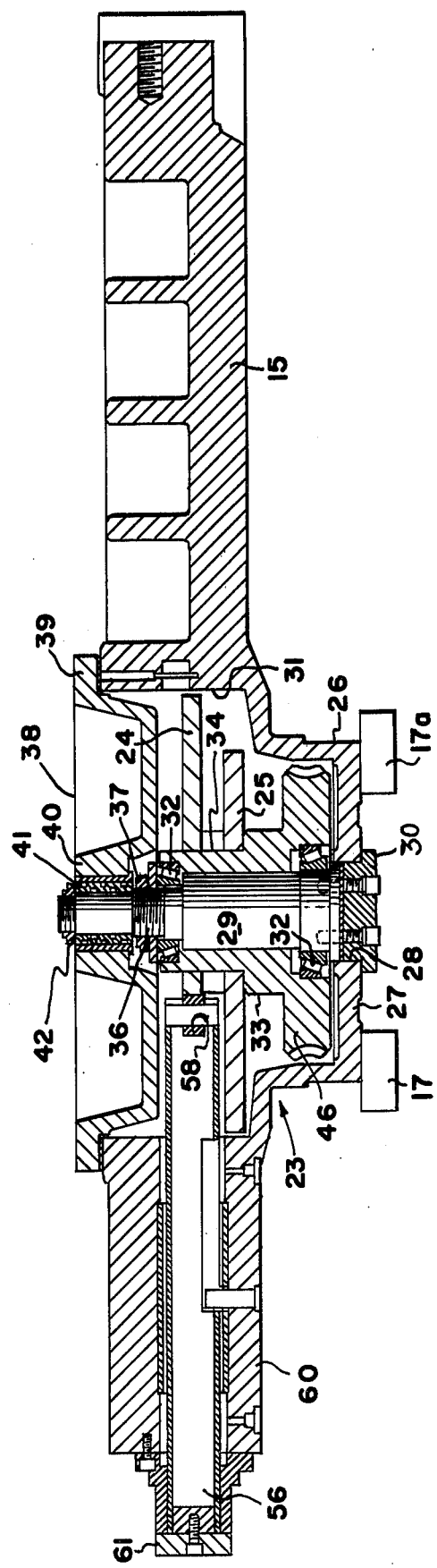
FIG.4
FIG.5

MACHINE TOOL CONSTRUCTION

The machine tool disclosed herein comprises a slant bed, cam controlled, contour turning, facing, and boring machine incorporating a tool supporting slide capable of compound movements so as to enable a variety of machining operations to be performed on one or more workpieces. For example, a workpiece may be turned, bored, faced, chamfered, tapered externally or internally, or provided with a tapered face, and combinations thereof. A particularly significant characteristic of the disclosed machine tool is its ability to have one set of cams replaced by another in an especially simple and rapid manner, thereby enabling different operations to be performed on the same or different workpieces without long delays between successive operations.

The prior art contains many examples of high production, cam controlled machinery of the general class to which the invention relates. All of the known machines which utilize mutually normal, reciprocable slides whose movements are controlled by cams have the undesirable characteristic that the substitution of one set of cams for another is a time consuming, laborious task necessitating removal of the tooling, removal of one or both slides, the use of cranes or the like in the handling of the cams, or a combination thereof. A machine tool constructed in accordance with the invention overcomes these disadvantages by the utilization of relatively small, manually portable cams and by arranging the cams and other parts associated therewith in such manner that one set of cams may be replaced by another without disturbing in any way the machine's tooling and without necessitating removal or adjustment of either of the slides.

An illustrative embodiment of a machine tool constructed in accordance with the invention is disclosed in the accompanying drawings, wherein:

FIG. 4 is a fragmentary view of certain portions of the machine as viewed in the direction of the arrows 4—4 of FIG. 1;

FIG. 5 is a horizontal sectional view through the horizontally reciprocable slide and taken along the lines 5—5 of FIG. 6;

Figure 2:
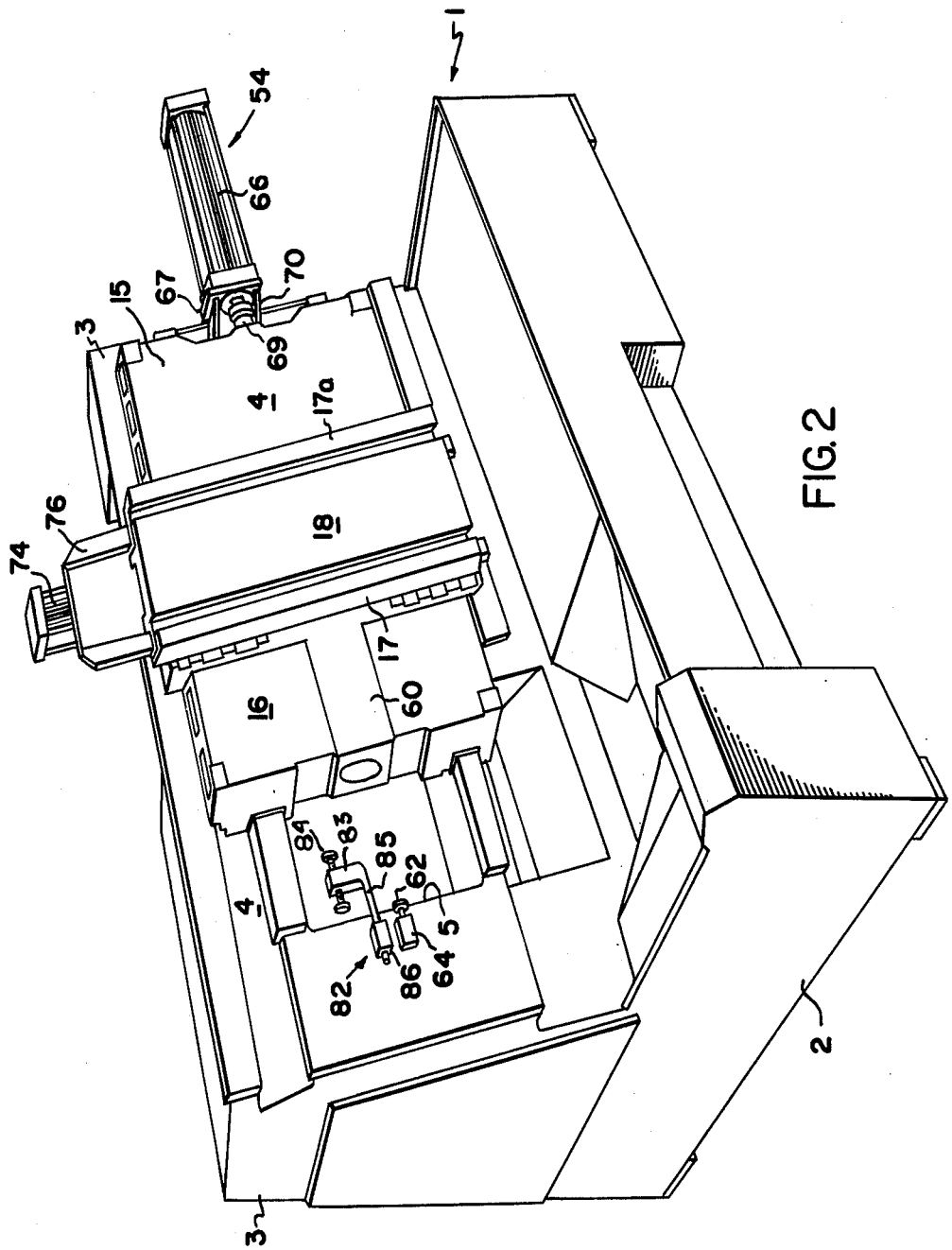
FIG. 2 is a veiw similar to FIG. 1, but omitting certain parts for clarity of illustration.

A machine tool constructed according to the invention comprises a main frame 1 having a horizontal base 2 provided at its rear end with an upstanding bed 3 having an upwardly and rearwardly inclined face 4. The bed 3 has an elongate opening 5 (FIG. 2) therein for a purpose subsequently to be explained.

Figure 1:
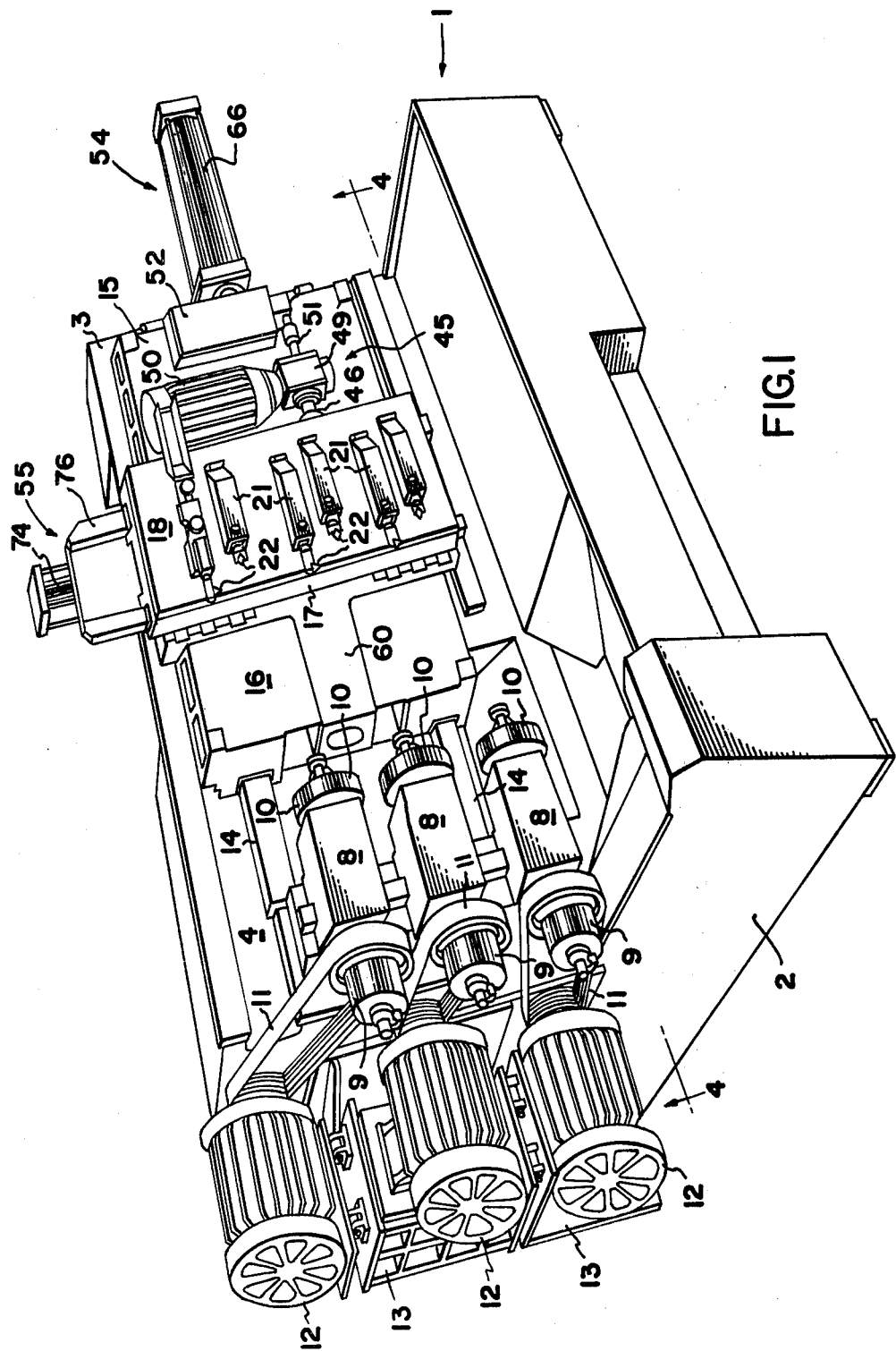
FIG. 1 is an isometric view of a preferred embodiment of the machine, the covers, shields, and similar parts being omitted.

At the left-hand end of the machine, as viewed in FIG. 1, one or more spindle supports 8 are mounted on the face 4 of the bed 3, each of the supports journaling a spindle 9 at one end of which is mounted a workpiece supporting chuck 10 of known construction. Each spindle is driven via belting 11 by a driving motor 12 mounted on supports 13 fixed to or adjacent the frame 1.

Fixed to the face 4 of the bed 3 are parallel ways 14 by means of which a slide 15 is mounted for reciprocable movements along a substantially horizontal path toward and away from the workpiece supporting chucks 10. The slide 15 has a front or forward face 16 on which are mounted parallel ways 17 and 17a on which is supported a second slide 18. The slide 18 thus is capable of movements with the slide 15 and also is capable of reciprocable movements laterally of the path of movement of the slide 15. The means for mounting of the slide 18 on the slide 15 will be described in greater detail hereinafter.

Mounted on the front or forward face of the slide 18 is a plurality of tool holders 21 of known construction, each of which supports a cutting tool 22 for engagement with a workpiece mounted in the associated chuck 10. It will be understood that the number and kinds of tool holders and tools mounted on the slide 18 will depend upon the number of workpieces to be operated upon and the kinds of operations to be performed on the workpieces.

From the description thus far it will be understood that movement of the first slide 15 along its horizontal path will effect corresponding movement of the slide 18 and its tooling and that movement of the slide 18 laterally of the path of movement of the slide 15 during movement of the latter will cause the tooling supported on the slide 18 to partake of a compound movement which is the resultant of the movements of the two slides. Thus, it is possible for the tooling to perform boring, facing, and contouring operations, both flat and tapered, on the workpieces.

Figure 3:
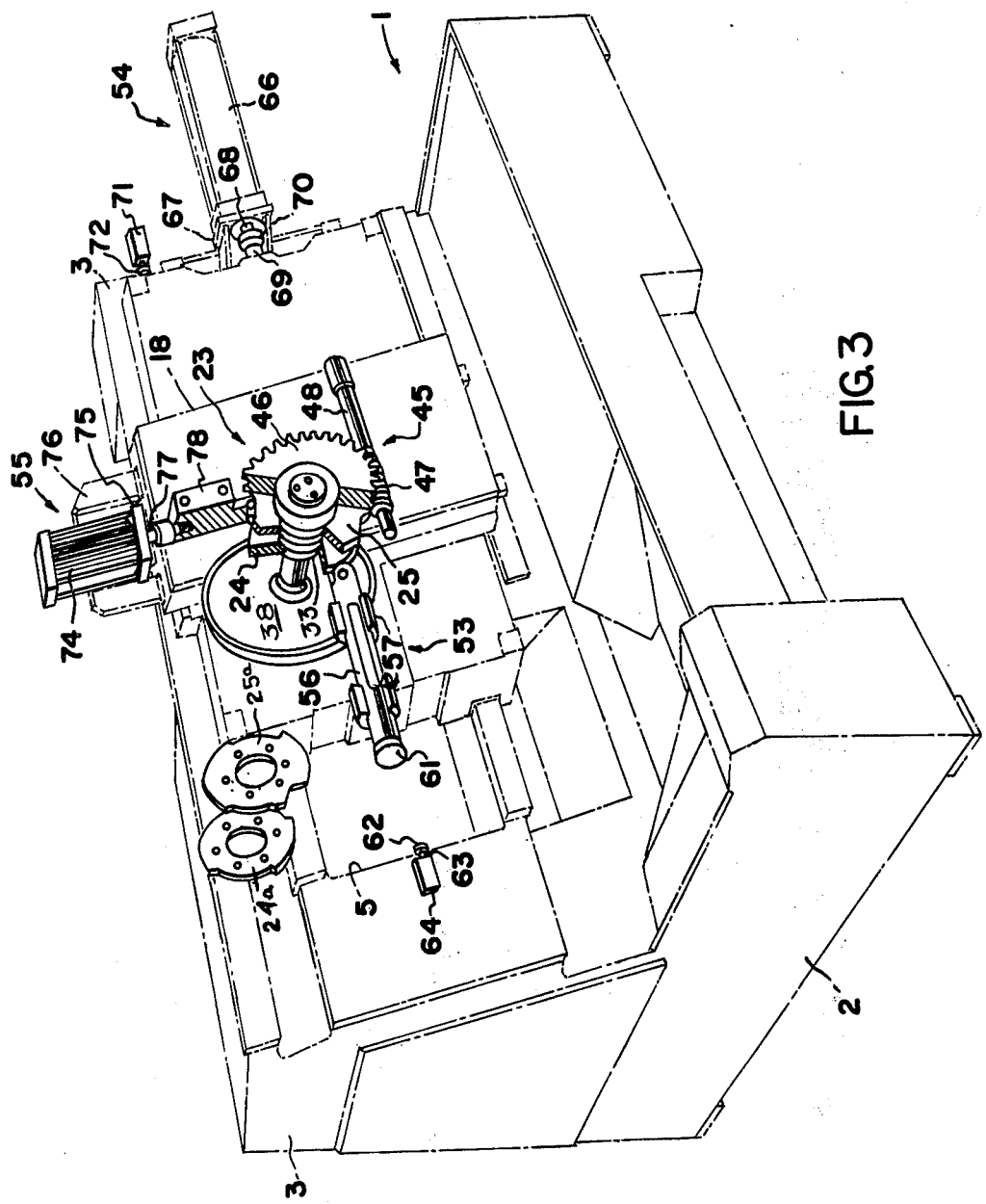
FIG. 3 is an isometric view of the control cams and related structure, with portions of the machine being illustrated in phantom lines for purposes of orientation.

The movements of the slides 15 and 18 are controlled by a rotatable cam assembly and associated structure best shown in FIGS. 3 and 5. The cam assembly is designated generally by the reference character 23 and comprises a first cam 24 for controlling movements of the first slide 15 and a second cam 25 for controlling movements of the second slide 18. Each cam is in the form of an annulus having its outer periphery contoured according to the movements to be imparted to its associated slide. The cam assembly 23 is accommodated in a housing 26 carried by the slide 15, the housing having a forward wall 27 provided with an opening 28. A shaft 29 extends through the opening 28 and carries at its forward end a flange or cap 30 which is bolted to the wall 27.

The shaft 29 extends rearwardly of the housing 26 and through a chamber 31 formed in the slide 15 and extends beyond the rear surface of the slide 15. Fitted over the shaft 29 and journaled thereon by bearings 32 is a hollow rotor 33 having a neck 34 on which the cams 24 and 25 are bolted or otherwise fixed. The rotor 33 thus is rotatable about the axis of the shaft 29. The shaft 29 has a threaded portion 36 on which a lock nut 37 is mounted for the purpose of maintaining the shaft 29 and its bearings assembled.

The chamber 31 is open at the rear end of the slide 15 and such opening normally is closed by an annular cover 38. The cover has a flange 39 which seats on the slide 15 and is provided with a central hub 40 through which the free end of the shaft 29 projects. Between the shaft and the hub is a radially expansible and contractile bushing 41 which normally is maintained under axial compression by a lock nut 42, thereby providing, together with the cap 30, a rigid mounting for the shaft 28. However, removal of the nut 42 enables rremoval of the cover 38 so as to provide access to the cams 24 and 25 from the rear of the slide 15, and it is to provide such access to the cams that the opening 5 is provided in the bed 3.

Driving means for rotating the cams 24 and 35 is designated generally by the reference character 45 and comprises a worm gear 46 carried by the rotor 33 and in mesh with a worm 47 fixed on a shaft 48 that is coupled to a speed reduction unit 49 driven by an electric motor 50 mounted on the slide 15. The unit 49 also is coupled by a shaft 51 to a known cam-controlled programming device 52 containing switches and circuitry (not shown) for controlling the operation of the motor 50 and other parts of the apparatus in a known manner.

Associated with and forming a part of the control cam mechanism 23 is rigid motion transmitting means 53, yieldable force applying means 54, and yieldable motion transmitting means 55, all of which are illustrated in FIG. 3. The motion transmitting means 53 comprises an elongate tappet 56 reciprocably mounted in bearing supports 57 and having at one end a roller 58 (FIGS. 5 and 6) which bears against the periphery of the cam 24 and is lightly maintained in engagement therewith by tension spring 59. The tappet 56 extends through a housing 60 carried by the slide 15 and is of sufficient length to project beyond the housing. The projecting end of the tappet 56 is fitted with a hardened wear plate 61 that is adapted to engage a stop 62 carried at one end of a plunger 63 that is reciprocable in a shock absorber housing 64 fixed to the bed 3 in such position that the stop lies in the path of movement of the slide 15.

The force applying means 54 comprises a preferably pneumatic cylinder 66 mounted on a bracket 67 that is fixed to the frame bed 3. Within the cylinder 66 is a piston (not shown) to which is connected one end of a piston rod 68. The other end of the piston rod 68 is coupled to a fitting 69 on the slide 15 by means of a coupling 70, the arrangement being such that reciprocation of the piston rod may effect reciprocation of the slide 15.

The frame bed 3 also supports a shock absorber housing 71 having a stop 72 located in the path of movement of the slide 15 for the purpose of providing a cushioned limit for movement of the slide 15 to the right, as viewed in FIG. 3.

Figure 8:
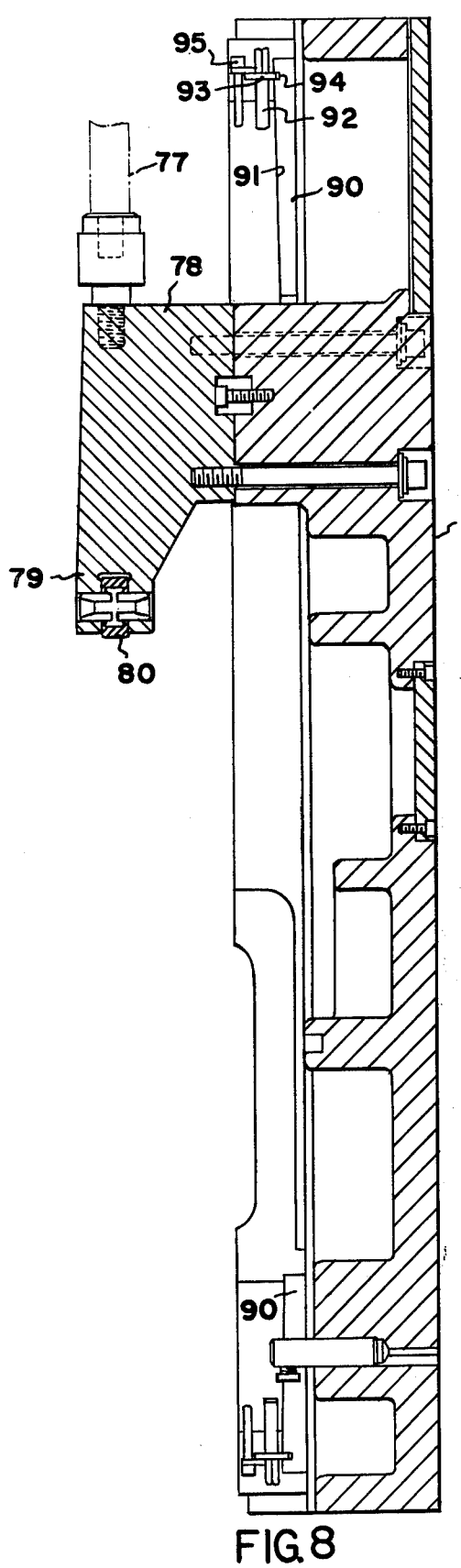
FIG. 8 is a sectional view taken along the line 8—8 of FIG. 7.

The motion transmission means 55 comprises a preferably pneumatic cylinder 74 fixed on a bracket 75 carried by an upstanding extension 76 forming part of the slide 15. A piston (not shown) within the cylinder 74 is fixed to one end of a piston rod 77, the opposite end of which is secured to a block 78 carried at the rear of the slide 18. See FIG. 8. The lower end of the block 78 has a tongue 79 in which is journaled a roller 80 that bears against the periphery of the cam 25.

When the apparatus thus far described is conditioned for the commencement of an operating cycle, the horizontally movable slide 15 will be at its extreme right-hand or rest position, as shown in FIG. 1, and the tool supporting slide 18 will be in a position determined by the contour of the cam 25 at its point of engagement with the roller 80 carried by the slide 18. The roller 58 carried by the tappet 56 will be in engagement with the cam 24 at a point on the latter corresponding to the beginning of the machining cycle. In these positions of the parts, workpieces to be machined may be fitted to the chucks 10.

To commence the operating cycle, the slide 15 is moved to the left by the force applying means 54 from the rest position shown in FIG. 1 to the an operating position in which the tappet 56 engages the stop 62. The driving motors 12 then may be energized to effect rotation of the chucks 12 and their associated workpieces and the motor 50 may be energized to effect rotation of the cams 24 and 25. During rotation of the cams, the force applying means 54 constantly exerts a force on the horizontally movable slide 15 urging the latter to the left, but movement of the slide 15 to the left is resisted by the rigidity of the tappet 56 which forms a rigid connection between the cam 24 and the machine frame via the stop 62.

Whenever rotation of the cam 24 presents a rising surface to the tappet 56, the abutment of the tappet with the stop 62 will cause the tappet to exert a force on the slide 15, via the cam 24, and move the slide 15 to the right a distance proportional to the cam rise. Such movement of the carriage 15 is permitted by the yieldability of the pressure fluid within the cylinder 56 of the force applying means 54. When rotation of the cam 24 presents a fall surface to the tappet, the force applying means 54 exerts a force on the slide 15 to maintain the cam 24 in engagement with the tappet 56, thereby resulting in movement of the slide 15 to the left. The slide 15 thus is enabled to reciprocate horizontally in accordance with changes in the contour of the cam 24.

The weight of the tool supporting slide 18, coupled with the downward force exerted by the motion transmitting means 55 maintains the roller 80 of the slide 18 in engagement with the periphery of the cam 25. Thus, as the cam 25 rotates a fall in its contour will enable the slide 18 to move downwardly, with corresponding movement of the tool holder 21, whereas a rise in the surface of the cam 25 will effect upward movement of the slide 18, as permitted by the yieldability of the pressure fluid in the cylinder 74, thereby enabling upward movement of the tool holders 21. These movements of the slide 18, although independent of the movement of the slide 15, are coordinated with the movement of the slide 15, via the contours of the cams 24 and 25, so as to enable the tools 22 to partake of movements necessary to perform the desired machining operations on the workpieces.

Following complete rotation of each of the cams 24 and 25, the machining of the workpieces will be completed, whereupon the force applying means 54 is actuated to return the slide 15 to the right to its initial position thereby enabling the workpieces to be removed from the chucks 10 and fresh workpieces substituted therefor in readiness for another cycle of operation.

When a desired number of workpieces has been machined and it is required to condition the apparatus for machining different workpieces or performing additional machining operations on the previously machined workpieces, it is necessary to replace the cams 24 and 25 with others having different contours so as to enable the machining tools to traverse the paths required. With apparatus constructed according to the invention, replacement of the cams 24 and 25 easily and quickly may be effected by raising the slide 18 via the cylinder 74 and removing the cover 38 thereby providing access to the cams 24 and 25 for removal thereof through the opening 5 in the frame bed 3. Different cams 24a and 25a (FIG. 3) may be substituted for the cams 24 and 25, respectively, following which the cover 38 may be replaced, the slide 18 lowered, and machining operations recommenced.

It is preferred that all of the cams adapted for use with the disclosed machine be sufficiently light in weight to enable them to be handled manually, thereby dispensing with the necessity for the use of cranes and the like.

A machine of the kind disclosed often may be required to machine workpieces of greatly different length or height. The apparatus thus far described is intended for use in conjunction with workpieces which are relatively short in length or wherein the machining operations are intended to be performed in the vicinity of the chucks 10. The machine easily can be conditioned for the machining of longer workpieces, however, or for performing machining operations more remote from the chucks 10 by the provision of an auxiliary stop mechanism 82 (FIG. 2) comprising a shock absorber housing 83 similar to the housing 64 and having an adjustable stop 84 therein, the housing 83 being carried at one end of an arm 85. The opposite end of the arm is pivotally mounted in a bracket 86 fixed on the frame bed 3. In the position of the auxiliary stop 82 shown in full lines in FIG. 2, it is inoperative. However, the arm 85 may be rotated to a position in which the stop member 84 will be interposed between the tappet 56 and the stop 62 so as to limit or restrict movement of the carriage 15 to the left from the position shown in FIG. 2.

When the auxiliary stop 82 is used, the operation of the machine is the same as that described earlier with the exception that the initial movement of the slide 15 to the left is less. Thus, at the commencement of machining operations, the machining tools are located at a greater distance from the chucks 10.

In the performance of machining operations on some workpieces, it is preferred that the tool supporting slide 18 be mounted on the slide 15 for movements normal and relative to the latter. In other instances, however, it is desirable that the tool supporting slide 18 be capable of movement laterally of, but not necessarily normal to, the path of movement of the slide 15. Apparatus constructed in accordance with the invention makes it possible for the latter objective to be achieved.

Figure 6:
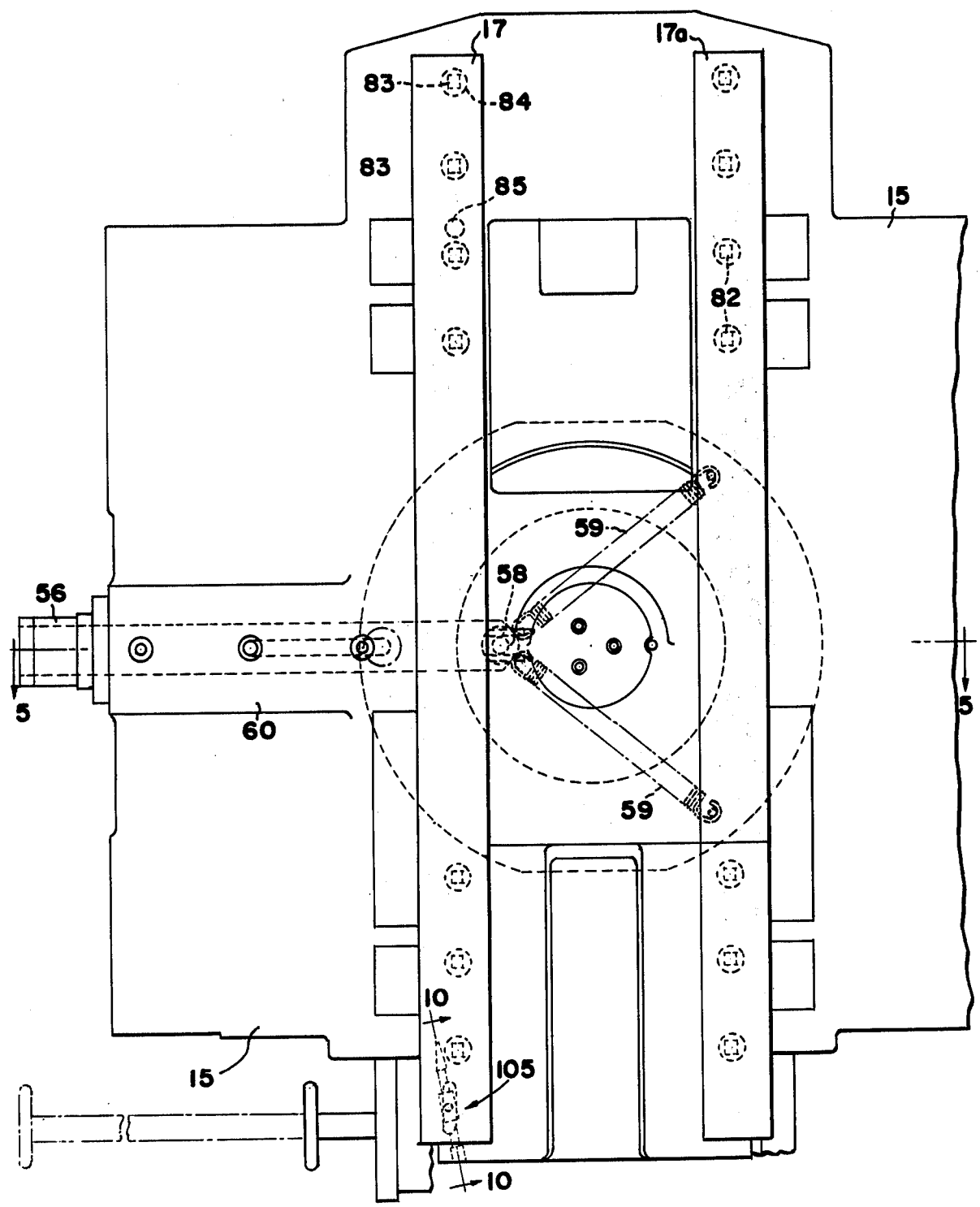
FIG. 6 is a fragmentary elevational view of the horizontally reciprocable slide and the vertically reciprocable slide and certain parts associated therewith.

As is best shown in FIG. 6, the way 17a is fixedly secured to the slide 15 by a plurality of bolts 82. The way 17, however, is secured to the slide 15 by similar bolts 83 and washers 84 which extend through slots in the way 17. A pivot pin 85 mounts the way 17 on the slide 15 for rocking movements about the axis of the pin 85 as permitted by the slots. The washers 84 react with the bolts to clamp the way 17 securely in place on the slide 15 when desired, but the bolts may be loosened to enable the way 17 to be rocked.

Figure 9:
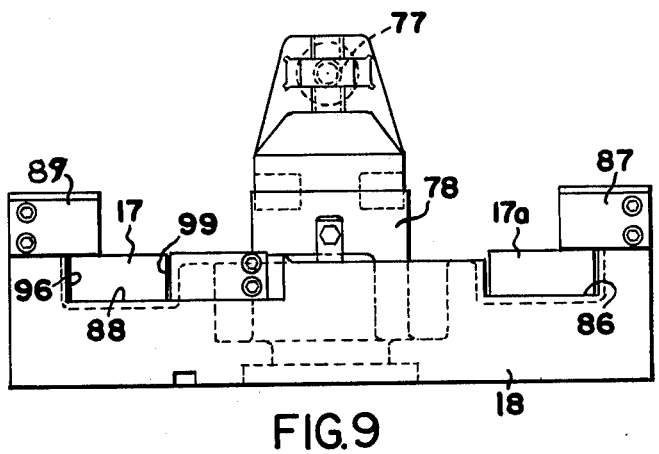
FIG. 9 is a top plan view of the apparatus shown in FIG. 7.

As is best shown in FIG. 9, the slide 18 has a groove 86 in which the way 17a is accommodated, the width of the groove 86 being greater than the width of the way 17a so as to provide clearance on opposite sides of the latter to enable the slide 18 to reciprocate along a path parallel to the way 17 even though the latter may have been rocked. A retainer 87 is fixed to the rear surface of the slide 18 and partially overlies the way 17a so as to retain the way in the groove 86 with sliding engagement between the way and the base of the groove 86 and between the way and the inner surface of the retainer 87. The slide 18 also is provided with a groove 88 in which the way 17 is accommodated and the slide is provided with a retainer 89 similar to the retainer 87 for the purpose of similarly retaining the way 17 in the groove 88. The clearance between the way 17 and the sides of the groove 88 may be just sufficient to permit sliding movement therebetween so as to provide for true tracking of the slide 18 along the way 17. Preferably, snug engagement between the ways 17a, 17 and the bases of the grooves 86, 88 is maintained by wedge shaped gibs 90 having one surface thereof engaging the associated way and the opposite surface bearing against a complementally tapered surface 91 formed on the associated retainer 87, 89. Each gib is adjustable axially of the associated retainer by an adjustment screw 92 having a flange 93 accommodated in a slot 94 formed in the gib. A flanged retaining screw 95 maintains the adjusting screw 92 in the adjusted position.

Figure 7:
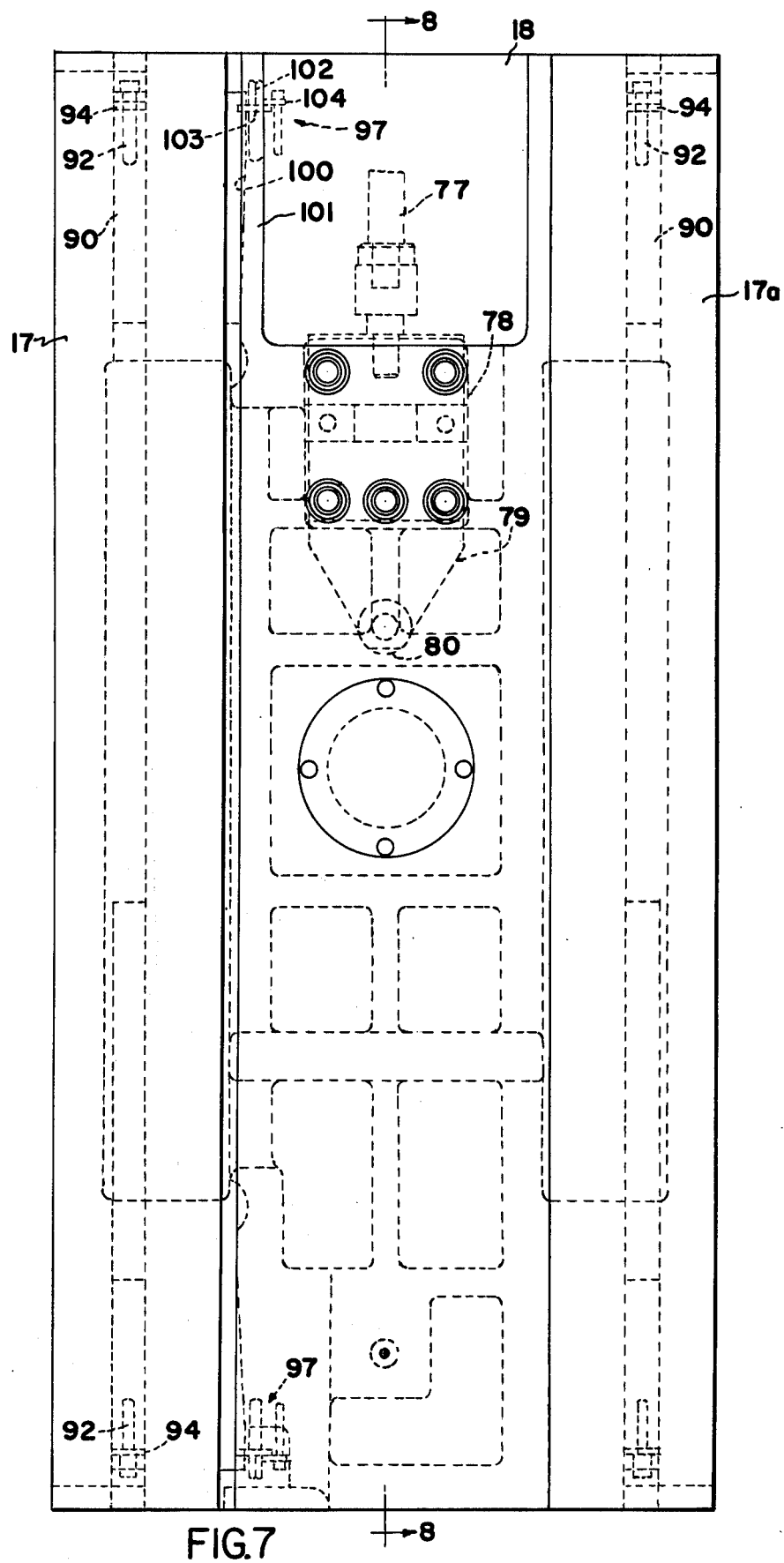
FIG. 7 is an elevational view of the vertically reciprocable slide.

If desired, gibs similar to the gibs 90 may be provided in association with either or both of the ways 17a, 17 for the purpose of assuring a true tracking relationship between the gib 17 and the left-hand surface 96 (as viewed in FIG. 9) of the groove 88. Such gibs are indicated by the reference character 97 in FIG. 7 for the way 17 and each comprises a wedge-shaped gib 98 interposed between the web 17 and the inner surface 99 of the groove 88, one surface of the gib 98 bearing against the way 17 and its opposite surface bearing against a complementally tapered surface 100 formed on an insert 101 carried by the slide 18. An adjusting screw 102 carried by the insert 101 has a flange 103 which fits into a notch formed in the gib 98 for adjusting the latter longitudinally of the way 17, and the insert 101 carries a flange locking screw 104 which bears against the flange 103 to maintain the gib in adjsuted position.

Figure 10:
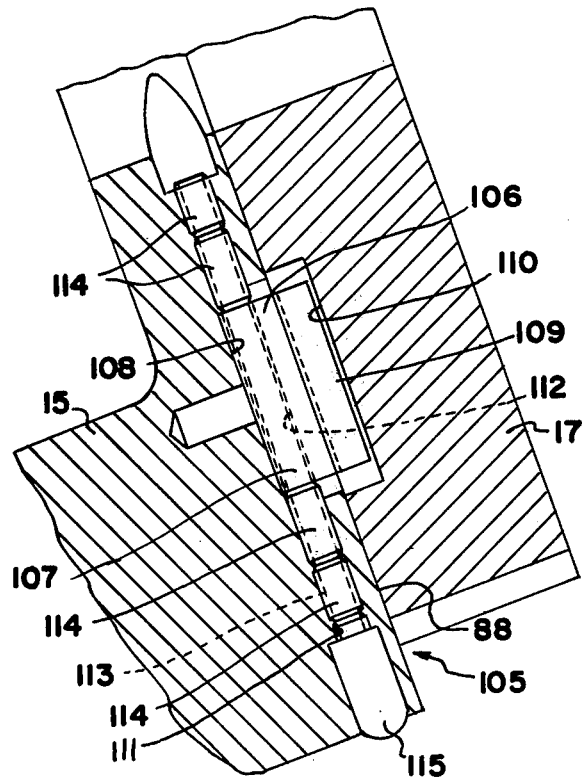
FIG. 10 is an enlarged cross sectional view taken along the line 10—10 of FIG. 6.

Means designated generally by the reference character 105 is provided to effect rocking adjustment of the way 17 and is best shown in FIGS. 6 and 10. The adjusting means comprises a key body 106 having a rib 107 accommodated in a slot 108 formed in the slide 15 and opening into the base of the groove 88. The body also has an upstanding rib 109 accommodated in a groove 110 formed in the inner surface of the way 17. The groove 108 is inclined at an angle of about 20° to the longitudinal axis of the groove 88, whereas the groove 110 parallels the longitudinal axis of the way 17. The rib 107 parallels the groove 108 and the groove 109 parallels the groove 110. The slide 15 is provided with a bore 111 which communicates with the groove 108 at opposite ends of the latter and the body 106 is provided with a communicating threaded bore 112. Through the bores 111 and 112 extends an adjusting screw 113, that portion of the screw extending through the bore 112 being correspondingly threaded. The screw 113 also passes through nylon or the like retainers 114 and is provided with a head 115 by means of which the bolt may be rotated. Rotation of the bolt in one direction causes movement of the body 106 upwardly relative to the slide 18, as viewed in FIG. 6, thereby effecting clockwise movement of the way 17. Reverse rotation of the adjusting screw effects counterclockwise rocking of the way 17.

When the way 17 is adjusted to a position in which movement of the slide 18 is not truly normal to the path of movement of the slide 15, upward or downward movement of the slide 18 will cause the cutting tools to traverse a path which is inclined to the axis of rotation of the workpiece supporting chucks 10. Thus, a tapered or chamfered surface may be formed on workpieces without the necessity of imparting movement to the slide 15. Such an arrangement in many cases can reduce the complexity of the contours of the cams utilized with the machine.

The disclosed embodiment is representative of the presently preferred form of the invention, but is intended to be illustrative rather than definitive thereof. The invention is defined in the claims.

We claim:

1. A machine tool comprising a frame having an upstanding bed provided with front and rear sides; means on said frame for supporting a workpiece; a first slide; means mounting said first slide on the front side of said bed for sliding movements along a path between rest and operating positions; yieldable force transmitting means acting between said frame and said first slide for moving the latter in opposite directions between said positions, said force transmitting means exerting a yieldable force on said first slide when the latter is in said operating position and biasing said first slide toward said operating position; a second slide; means mounting said second slide on said first slide for movements with the latter and for movements laterally of said path, said second slide being biased by gravity to move in one direction laterally of said path; rotatable first and second cam means carried by said first slide; driving means for rotating said cam means; first motion transmitting means acting between said first cam means and said frame for effecting movements of said first slide along said path in response to rotation of said first cam means; and second motion transmitting means acting between said second slide and said second cam means for effecting movement of said second slide in the opposite direction laterally of and relatively to said first slide in response to rotation of said second cam means.

2. A machine tool according to claim 1 wherein said second slide is mounted on that side of said first slide remote from said bed, said first slide having an opening in its opposite side, said first and second cam means being fitted into said opening, and said bed having an opening therethrough communicable with the opening in said first slide.

3. A machine tool according to claim 2 wherein said first and second cam means are accessible through said opening.

4. A machine tool according to claim 1 wherein said drive means is carried by said first slide.

5. A machine tool according to claim 1 wherein said first motion transmission means comprises a tappet slidably mounted on said first slide for engagement of one end of said tappet with said first cam means.

6. A machine tool according to claim 5 including stop means carried by said frame for engagement with said tappet at its other end.

7. A machine tool according to claim 6 including auxiliary stop means carried by said frame for movement into and out of a position engageable by said other end of said tappet.

8. A machine tool according to claim 1 wherein the mounting means for said second slide is adjustable, and means for adjusting the mounting means for said second slide between positions in which the movement of said second slide laterally of said first slide is selectively normal to or at an inclination less than 90° to the path of movement of said first slide.

9. A machine tool according to claim 1 including stop means carried by said frame and located in the path of movement of said first slide toward said operating position for defining said operating position.

10. A machine tool according to claim 9 including auxiliary stop means carried by said frame and means mounting said auxiliary stop means for movements into and out of the path of movement of said first slide toward said operating position for defining a second operating position different from the first mentioned operating position.

11. A machine tool comprising a frame having an upstanding bed; means on said frame for supporting a workpiece; a first slide; means mounting said first slide on said bed for reciprocating movements along a substantially horizontal path between rest and operating positions; a second slide; means mounting said second slide on said first slide for movements with the latter and for movements laterally of said path, said second slide being biased by gravity to move in one direction laterally of said path; means on said second slide for supporting a workpiece engageable tool; a pair of rotatable cams; means mounting said cams on said first slide for movements therewith; first motion transmitting means acting between said frame and one of said cams for imparting movement to said first slide in response to rotation of said one of said cams; yieldable force applying means acting between said frame and said first slide for moving the latter in opposite directions between said positions, the yieldability of said yieldable force applying means enabling movement of said first slide by said motion transmission means in a direction toward said rest position when said first slide is in said operating position; second motion transmitting means acting between said second slide and the other of said cams for imparting movement to said second slide in the opposite direction in response to rotation of said other of said cams; and driving means for rotating said cams.

12. A machine tool according to claim 11 including stop means carried by said frame in the path of movement of said first slide for limiting movement of the latter toward said operating position.

13. A machine tool according to claim 12 including auxiliary stop means carried by said frame and means mounting said auxiliary stop means for movements into and out of the path of movement of said first slide for further limiting movement of said first slide toward said operating position.

14. A machine tool according to claim 11 wherein said first motion transmission means comprises a tappet slidably mounted on said first slide for engagement of one end of said tappet with said first cam means.

15. A machine tool according to claim 14 including stop means carried by said frame for engagement with said tappet at its other end.

16. A machine tool comprising a frame having a base and an upright bed extending above said base, said upright bed having front and rear sides and an opening in its rear side; a first slide having an opening therein communicable with the opening in said bed; means mounting said first slide on the front side of said upright bed for reciprocable movements along a substantially horizontal path; a second slide; means mounting said second slide on said first slide for movements with the latter and for reciprocable movements relative to said first slide laterally of said path, said second slide being biased by gravity to move in one direction laterally of said path; means on said second slide for supporting tooling; a pair of rotatable cams accommodated in said opening of said first slide; means removably mounting said cams on said first slide for movements with the latter, said mounting means being accessible via said openings for removal and replacement of said cam from the rear side of said upright bed without disturbing said tooling supporting means; first motion transmitting means acting between one of said cams and said first slide for imparting movement of the latter in response to rotation of said one of said cams; second motion transmitting means acting between the other of said cams and said second slide for imparting movement to the latter in response to rotation of said other of said cams; means on said frame for supporting a workpiece in a position to be engaged by tooling supported on said second slide; and driving means for rotating said cams.

17. A machine tool according to claim 16 wherein the mounting means for said cams comprises a shaft supported at one end by said first slide, means journalling said cams on said shaft, and bearing means removably carried by said first slide for supporting the opposite of said shaft.

18. A machine tool according to claim 17 wherein said first slide has an opening in communication with the first mentioned opening, said bearing means being carried by a cover removably fitted into and normally closing the opening in said first slide.

19. A machine tool according to claim 16 wherein the mounting means for said second slide comprises a pair of spaced apart ways, at least one of said ways being rockable about an axis, and means for rocking said one of said ways about said axis.

* * * * *

UNITED STATES PATENT AND TRADEMARK OFFICE
CERTIFICATE OF CORRECTION

PATENT NO. : 4,165,661
DATED : August 28, 1979
INVENTOR(S) : Anthony Wasco, Jr. et al It is certified that error appears in the above-identified patent and that said Letters Patent are hereby corrected as shown below:

Column 3, line 10, change "rremoval" to -- removal --; line 15, change "35" to -- 25 --; line 34, change "spring" to -- springs --.

Column 4, line 11, second occurrence, delete "the".

Column 6, line 25, change "gib" to -- way --.

Column 7, line 50, change "opening" to -- openings --.

Column 8, line 31, delete "in opposite directions".

Column 9, line 7, change "cam" to -- cams --.

Signed and Sealed this

Twelfth Day of February 1980

[SEAL]

Attest:

Attesting Officer

SIDNEY A. DIAMOND

Commissioner of Patents and Trademarks